United States Patent [19]
Subbiah et al.

[11] Patent Number: 6,035,403
[45] Date of Patent: Mar. 7, 2000

[54] BIOMETRIC BASED METHOD FOR SOFTWARE DISTRIBUTION

[75] Inventors: Subramanian Subbiah, Philadelphia, Pa.; Yang Li, Mountain View; D. Ramesh K. Rao, Menlo Park, both of Calif.

[73] Assignee: HUSH, Inc., Menlo Park, Calif.

[21] Appl. No.: 08/925,201

[22] Filed: Sep. 8, 1997

Related U.S. Application Data

[60] Provisional application No. 60/025,913, Sep. 11, 1996, and provisional application No. 60/025,949, Sep. 11, 1996.

[51] Int. Cl.[7] ................................................ G06F 12/14
[52] U.S. Cl. ................................ 713/201; 713/202
[58] Field of Search .......................... 395/187.01, 186, 395/188.01, 712; 382/124, 115, 116; 380/4, 3, 25, 23; 713/200, 201, 202; 705/39; 283/68, 78; 709/217, 218, 219

[56] References Cited

U.S. PATENT DOCUMENTS

| | | |
|---|---|---|
| 2,952,181 | 9/1960 | Mawer . |
| 4,151,512 | 4/1979 | Riganati et al. ...................... 340/146.3 |
| 4,322,163 | 3/1982 | Schiller et al. ............................. 356/71 |

(List continued on next page.)

FOREIGN PATENT DOCUMENTS

| | | | |
|---|---|---|---|
| 0348182A2 | 12/1989 | Japan ............................... | G06K 9/20 |
| 0348182A3 | 12/1989 | Japan ............................... | G06K 9/20 |
| 04111038 | 4/1992 | Japan ............................... | G06F 15/00 |
| 04352548 | 12/1992 | Japan ............................... | H04M 1/66 |

OTHER PUBLICATIONS

Gaffney, Jr., J.E., "Fingerprint Pattern Offset Determination and Matching Method;" pp. 773–774; Aug. 3, 1974; *IBM Technical Disclosure Bulletin*.

Rao, T.C., "Feature Extraction for Fingerprint Classification," pp. 181–192; Aug. 9, 1975; *Pattern Recognition Letters*.

"Software Theft Extends Well Beyond China," May 20, 1996, *Wall Street Journal*.

"New Chip Verifies Fingerprints," May 22, 1997, Tom Abate, *San Francisco Chronicle*.

"Embeddable Module for Fingerprint Capture and Matching," Sep. 11, 1996, D. Ramesh K. Rao, et al., U.S. Provisional application Ser. No. 60/025,949.

"Method of Using Fingerprints to Eliminate Wireless Phone Fraud and to Ascertain a Caller's Identity," Sep. 11, 1996, U.S. Provisional Application Ser. No. 60/025,947.

*Primary Examiner*—Joseph E. Palys
*Assistant Examiner*—Rijue Mai
*Attorney, Agent, or Firm*—Beyer & Weaver, LLP

[57] ABSTRACT

A method is provided for protecting distributed software, either through the internet/telephone networks or via physical storage media like floppy diskettes, magnetic tapes, CD-ROMS, DVD-ROMS, etc., by using biometric information (personal fingerprint information in particular). In one approach, the fingerprint of the software purchaser is embedded into the purchased software at the time of purchase. All subsequent use of the software by the purchaser at his/her home or office is subject to (a) providing his/her fingerprint again and (b) the fingerprint matches that embedded in the purchased software. In another related approach, prior to the use or installation of distributed software, the user's computer calls a central management server station. The software then requests the user to provide his or her fingerprint by any device that would capture such information. The fingerprint information is then processed on the local user computer by any image processing program, and the relevant information is then sent to the central server along with a key or serial number that is built into the distributed software. The central management server then compares the provided information with the information previously stored in its central database and decides whether the user is authorized. Such a method can also be employed in a license management system whereby software product usage can be remotely monitored and fees for usage charged appropriately.

12 Claims, 6 Drawing Sheets

U.S. PATENT DOCUMENTS

| | | | |
|---|---|---|---|
| 4,537,484 | 8/1985 | Fowler et al. | 354/62 |
| 4,747,147 | 5/1988 | Sparrow | 382/4 |
| 5,260,999 | 11/1993 | Wyman | 384/4 |
| 5,337,357 | 8/1994 | Chou et al. | 380/4 |
| 5,420,936 | 5/1995 | Fitzpatrick et al. | 382/124 |
| 5,467,403 | 11/1995 | Fishbone et al. | 382/116 |
| 5,493,621 | 2/1996 | Matsumura | 382/124 |
| 5,495,411 | 2/1996 | Ananda | 364/401 |
| 5,509,070 | 4/1996 | Schull | 380/4 |
| 5,613,012 | 3/1997 | Hoffman et al. | 382/115 |
| 5,721,583 | 11/1996 | Harada et al. | 348/12 |
| 5,724,426 | 3/1998 | Rosenow et al. | 380/25 |
| 5,748,765 | 5/1998 | Takhar | 382/582 |
| 5,781,724 | 7/1998 | Nevarez et al. | 395/186 |
| 5,805,897 | 9/1998 | Glowny | 395/712 |
| 5,826,011 | 10/1998 | Chou et al. | 395/186 |
| 5,838,790 | 4/1998 | McAuliffe et al. | 380/4 |
| 5,870,723 | 2/1999 | Pare, Jr. et al. | 705/39 |

| Serial Number 401 | Fingerprint Information 402 |
|---|---|
|  |  |

FIG. 4

BIOMETRIC BASED METHOD FOR SOFTWARE DISTRIBUTION

CROSS REFERENCE TO RELATED APPLICATIONS

This application claims priority from (1) U.S. Provisional Patent Application No. 60/025,913 filed Sep. 11, 1996, entitled BIOMETRIC BASED METHOD FOR SOFTWARE DISTRIBUTION and naming Y. Li, D. R. K. Rao, and S. Subbiah as inventors, and (2) U.S. Provisional Patent Application No. 60/025,949, filed Sep. 11, 1996, entitled EMBEDDABLE MODULE FOR FINGERPRINT CAPTURE AND MATCHING, and naming R. Rao, S. Subbiah, Y. Li, and D. Chu as inventors. Both of these applications are incorporated herein by reference in their entireties and for all purposes.

BACKGROUND OF THE INVENTION

Software piracy has been and will always be a major enemy in the software industry. Billions of dollars in revenue are lost each year due to unauthorized copying and distribution of pirated software (see May 20, 1996 of the Wall Street Journal). Due to the lack of effective methods in the losing battle against software piracy, the software industry can only hope that for every ten copies of software distributed only one copy is purchased legitimately. This lost revenue to the software industry is reflected by the higher prices of software in the market; both legitimate software buyers and companies that sell the software are the victims.

The various methods that software companies currently use to protect their products from unauthorized copying work to some extent in preventing individual users from making a small number of copies for friends/relative etc. Nevertheless, these methods have been largely ineffective against the large organized piracies in Europe and Asia. It has been argued, and to some degree legitimately, that the former type of software copying—individual consumers giving friends and relatives copies—is actually a healthy contribution to the software industry as this amounts to a free form of advertising. Particularly with the now-standard so-called "guilt banners" that loudly proclaim the original buyer's name, it is believed that sooner or later these friends/relatives will value the product enough to buy their own original copies. However, this perceived boon is not at all true of the completely destructive effects of the latter type of large scale organized piracy.

As well known in the state of the art some of these partly effective existing methods include (a) locking out simple copying commands from most operating systems to prevent direct copying of the disk containing the software (which can be readily bypassed with more sophisticated copying software); (b) software only offered on a CD-ROM which can then periodically check for the presence of the original purchased CD during the running of the program (however, with the availability of low-cost recordable CD-ROM drives, this no longer suffices); and (c) a password system which requires the user to type a password that is provided in the original users' manual in the form of a serial number or key word during the running of the program or the initial installation of the program (however, such passwords can be readily copied and distributed along with the pirated software themselves; they can also be forgotten).

Given the difficulties of these marginally effective methods, a preferred approach would be for the authorized user to give or be given a "key", which cannot be duplicated, to each copy of the software such that the software will only run or be installed when the correct "key" is present. This method requires that the "key" cannot be duplicated and distributed. Advanced methods along these lines have been recently described; see for example, U.S. Pat. No. 5,337,357 (Chou et al.) and U.S. Pat. No. 5,260,999 (Wyman), both of which are incorporated herein by reference for all purposes. In particular, the method for protecting distributed software by Chou et al. relies on a unique factor such as an accessible serial number or the generation of a profile of the computer of the user which is entered individually and/or with a random factor to generate a unique first key which will differ for different computers. The first key is sent to a processing center which then generates a second key. The user applies the second key which compares the unique and/or random factors. If the comparison matches, the first and second keys are used in an algorithm in the software to generate a decrypting key permitting the customer to purchase the selected program(s).

While this technique provides some improvement over traditional piracy avoidance techniques, it suffers from certain difficulties. For example, a user cannot easily move his/her copy of the software from one machine to another or install the software on multiple machines in his/her possession. As is understood in the art, such usage is often legitimate.

What is needed therefore is an improved method for authenticating operation of software that does not rely on the profile of a particular machine.

SUMMARY OF THE INVENTION

The present invention protects software from unauthorized distribution. It accomplishes this by employing biometric information, particularly the personal fingerprint information that is unique to every individual, to generate the user-specific "key" rather than the serial number of the computer, phone number of the computer, etc. This then ensures that the purchased/distributed software can only be operated by the person/persons who purchased it. By this invention, each copy of the software is uniquely assigned to one user, and the software is authorized for use only in the presence of the user.

One aspect of the invention provides a method (which may be provided as a sequence of steps stored on a computer readable medium) for controlling installation of a software program. This method may be characterized as including the following: (a) providing (i) fingerprint data from a user and (ii) a separate identifier of the software program (e.g., a serial number); (b) determining whether the fingerprint data provided allows installation of the software program; and (c) if the fingerprint data is not found to allow installation, blocking installation. Preferably, this method is implemented for purchase of software over the Internet.

In one embodiment, step (a) involves transmitting the user's fingerprint data and a serial number of the software program from a local computer of the user to a remote authentication system controlled by an enterprise responsible for distribution of the software program. The authentication system may then transmit instructions to block to the local computer.

As an extra check on the installation, the system may also determine whether the number of installations exceeds a pre-set maximum. Installation is then blocked if the number of installations is found to exceed the pre-set maximum.

Another aspect of the invention provides a method for controlling use of a software program. This method may be characterized as including the following: (a) accepting fingerprint data from a user of the software program; (b) comparing the user's fingerprint data with stored fingerprint data provided for the software program; and (c) if the user's fingerprint data does not match the stored fingerprint data, blocking execution of the software program. In some embodiments, the method will begin with the system prompting the user to provide the fingerprint data prior to continued execution of the software program.

Preferably, the stored fingerprint data was obtained from a purchaser of the software program contemporaneous with a purchase of the software program. The purchaser is then an authorized user of the software. In some embodiments, the purchaser may give use authorization to a limited number of other people. In such cases, the system must store fingerprint data for a plurality of users of the software program.

Yet another aspect of the invention provide, a method for controlling use of a software program on a pay-per-use basis. This method may be characterized as including the following: (a) accepting fingerprint data from a user of the software program; (b) determining whether the user's fingerprint data allows access to the software program; and (c) if the user's fingerprint data is found to allow access to the software program, monitoring a quantity of use of the software by the user so that the user can be charged for the quantity of use. In one embodiment, a length of time during which the software program is operated comprises the quantity of use.

It should be understood that the present invention also relates to machine readable media on which are stored software produced in accordance with the requirements of this invention, or program instructions for performing methods of this invention. Such media include, by way of example, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer. Furthermore, program instructions implementing this invention may sometimes be transported over a communications network.

These and other features and advantages of the invention will be described in detail below with reference to the associated figures.

BRIEF DESCRIPTION OF THE DRAWINGS

FIG. 4. is a depiction of a list of fingerprints retained by an enterprise for the purpose of authenticating each new installation of a software program in accordance with the second preferred embodiment of this invention.

DETAILED DESCRIPTION OF THE PREFERRED EMBODIMENTS

Figure 1:
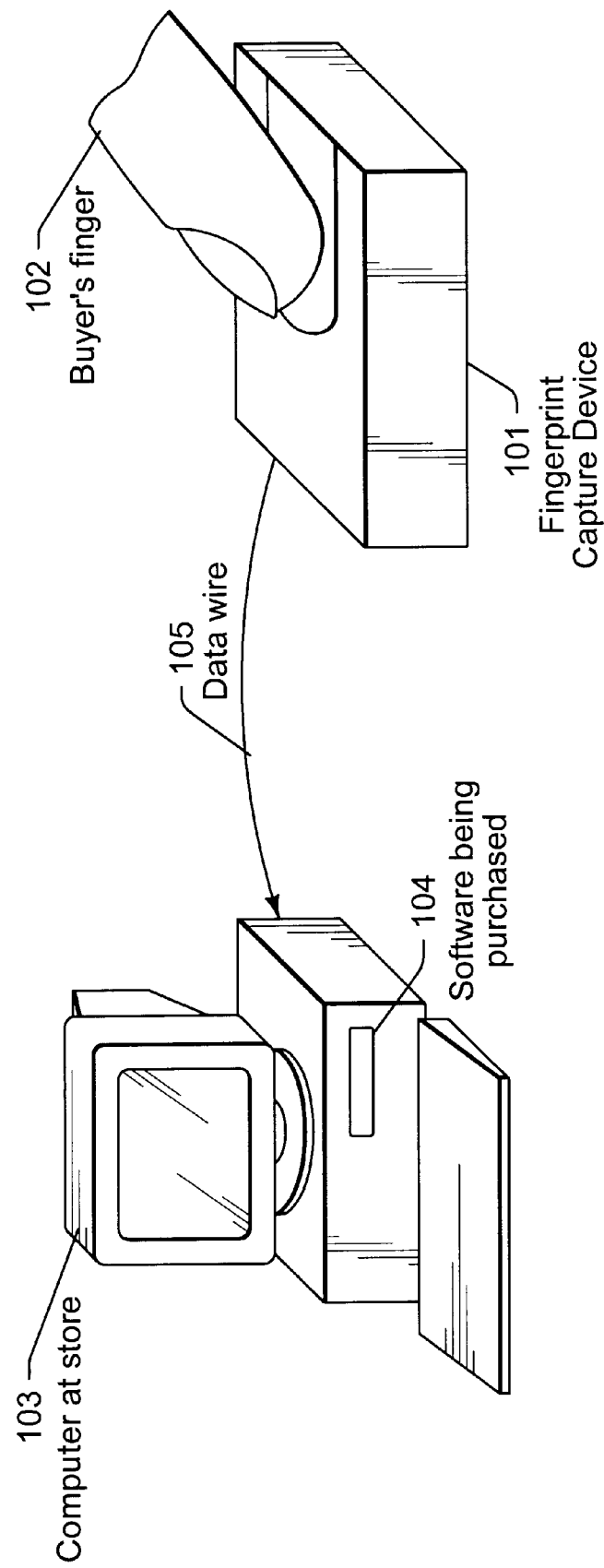
FIG. 1. is an illustration of an apparatus/device that may be employed to register a copy of a software program with a user's fingerprint.

For purposes of this discussion, the term "computer" will generically refer to all computing devices, including personal computers, network computers, bridges, routers, work stations, supercomputers, embedded computer processor chips, etc.

Biometric information includes many different types of personal information including, for example, a user's voice, personal information, photograph, hand shape, retina, palmprint, and fingerprint. Although, any of these can be used with this invention, fingerprints are preferred for various reasons. First of all, the biometric information must be unique and theoretically no two persons should have the same information. Secondly the "key" has to be easily remembered by the user and yet not easily duplicated by others. Thirdly, the search time has to be instantaneous. Finally, the device that scans the biometric information has to be user-friendly and easy to use. Fingerprint technology meets all these requirements simultaneously.

Fingerprint technology including hardware image capture, software image processing, software/hardware for fingerprint data storage and software for fingerprint analysis/comparison is a relatively mature technology with over 20 years of development (see, for example, U.S. Pat. Nos. 2,952,181, 4,151,512, 4,322,163, 4,537,484, 4, 747,147, 5,467,403, each of which is incorporated herein by reference for all purposes). The term "fingerprint" as used herein refers to handprints, palmprints, and other unique skin patterns in addition to traditional fingerprints.

The present invention may employ sophisticated hardware and software to allow rapid fingerprint based identification as described in U.S. Provisional Application No. 60/025,949, filed on Sep. 11, 1996, naming R. Rao, S. Subbiah, Y. Li & D. Chu as inventors, and previously incorporated by reference. That application describes an extremely small, low-cost fingerprint capture hardware module that lends itself to ready insertion into many devices. The referenced Provisional Application was incorporated herein by reference for all purposes and is illustrative of the maturity of the fingerprint capture and comparison technology.

In general, the present invention provides techniques which rely on comparison of stored fingerprint data with a user's fingerprint data taken at the time of installation or operation of a software program. Such methods may be employed for the purpose of controlling software distribution. Various methodologies employing such comparison may be used with this invention. For purposes of illustration, two such methods are described below.

1. Method Employing Fingerprints Before Each Operation

This method will be described with reference to FIGS. 1 and 2. It requires that both the buyer of the software and the store where the software is sold have a fingerprint capturing device attached to a computer on which the software would be run. Such fingerprint capturing devices can be of any kind and from any of a number of manufacturers (e.g. from Identix of Sunnyvale, Calif.; Digital Biometrics of Minnentonka, MN; Printrack of Los Angeles; Morpho of France). In a preferred embodiment, a specially modified computer mouse or standard computer peripheral, like a keyboard or pointing device, as described in U.S. Provisional Application No. 60/025,949, previously incorporated by reference, can be used to capture the fingerprints at very low-cost.

Figure 2:
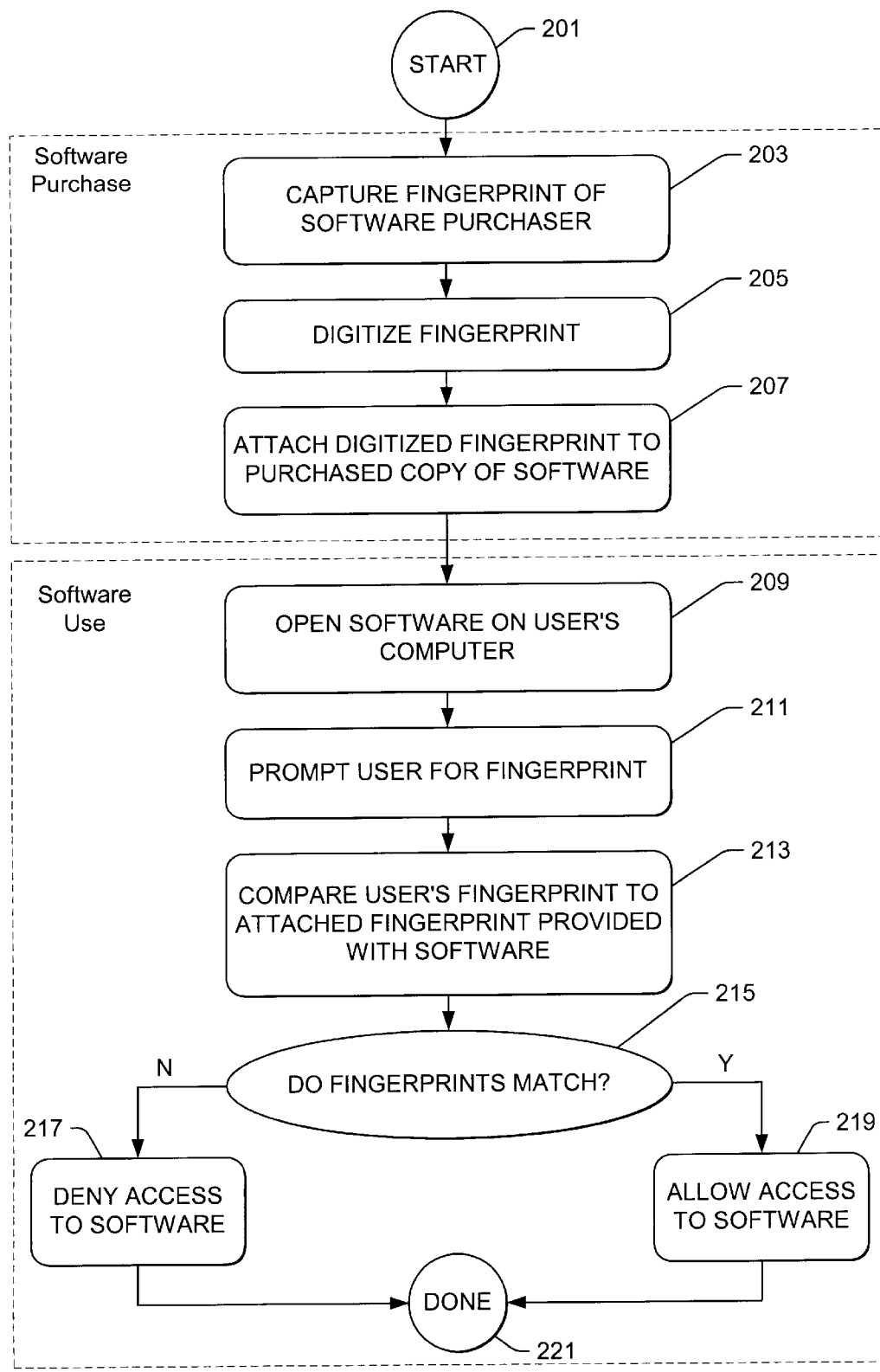
FIG. 2 is a process flow diagram depicting steps employed in a first method for authenticating operation of a software program in accordance with a preferred embodiment of this invention.

As depicted in FIG. 1, the fingerprint information is captured by any of these means at the software store where the user purchases the software. At the time of the purchase, the particular copy of a software program 104 being purchased is put into a disk drive or some other storage media of a computer 103 that has a fingerprint capturing device 101 attached to it directly, or through a network. A generic data connection 105 connects computer 103 with fingerprint capture device 101.

A preferred sequence of operation 200 will now be described with reference to the flow chart of FIG. 2. The process begins at 201, and in a step 203 the buyer then inserts the finger(s) 102 of his/her choice into the capturing device 101. The captured fingerprint information is then processed by converting to a digital representation (e.g., a collection of minutiae) at a step 205 and subsequently written and attached (e.g., embedded in the executable version of the distributed code in a suitably encrypted manner) to the copy of the software being purchased 104 at a step 207.

After leaving the store, the user will attempt to install and/or operate the purchased software program at a step 209. At that time, the program asks the user to put the finger(s) 102 on the buyer's fingerprint capturing device at a step 211. Next, at a step 213, the program compares the recently captured fingerprint data with the stored fingerprint data embedded in the program when the software was purchased. The program can then determine whether the two sets of fingerprint data match at a decision step 215. Assuming that the program finds that the fingerprint data does not match, it denies access to the software at a step 217. The process then concludes at 221. If on the other hand, the program finds that the new and stored fingerprints do match (i.e., decision step 215 is answered in the affirmative), access to the software is allowed at a step 219. The process then concludes at 221.

Only when the fingerprint information matches that encoded with the purchased software does the installation of the software occur. This method ensures that only the original buyer of the software is authorized to both first install and then at all subsequent times use the software.

Such a process could be reversed if the buyer desires to return the product to the store. Upon return of the software the buyer's fingerprint information is again captured in the store. If this captured fingerprint information matches the fingerprint information encoded with the software, the buyer's fingerprint is erased from the software allowing it to be purchased again by another buyer.

In a modification of the method, the single buyer of the software can be permitted to authorize his/her friends/ relatives to use it for limited periods of time. For instance, the buyer can allow a few limited users to add their fingerprint to the software at any time. These temporary secondary users can use the product or copy of the product on other computers for a while. Under such conditions, the purchased software will either upon a fixed time (a few weeks) or a fixed number of user sessions disable itself and not allow these secondary users to continue using the program. Continued use will require these secondary users to approach the original buyer and have him/her re-validate the software for another fixed period of time or a fixed number of sessions. This modification allows the continuation of the legitimate perception that allowing temporary access to the original buyer's friends and families amounts to free advertisement of the software, with the expectation that these secondary users will ultimately buy their own copy to avoid the nuisance, inconvenience, and embarrassment of repeatedly approaching the original buyer to re-validate their increasingly illegal use.

While this method represents a significant advance, it may in theory be susceptible to a "generic" or a fake fingerprint being given at the time of purchase. Then, the software could be copied en masse and distributed with multiple copies of this "generic" or fake fingerprint. For example, such a generic fingerprint could come from a plastic molded finger with fake but realistically detailed fingerprint lines/ridges etched onto it. A particularly gruesome source for a generic fingerprint could be from a suitable embalming of a finger from a dead person. While it is true that specialized fingerprint capture hardware (e.g., hardware available from Identix Corporation of Sunnyvale, Calif.) can differentiate the presence of a "warm living finger" from a "dead finger" or a "fake copy," the second method described in the next section avoids this potential problem all together.

2. Method Employing Fingerprints Before Each Installation

This method will be described with reference to FIGS. 3–5. It only requires the buyer, and not the store, to halve a fingerprint capturing device. As illustrated, the buyer purchases software 304 from a store. Each copy of the software has a unique serial number embedded in it by the software manufacturer 401 (FIG. 4).

Figure 5:
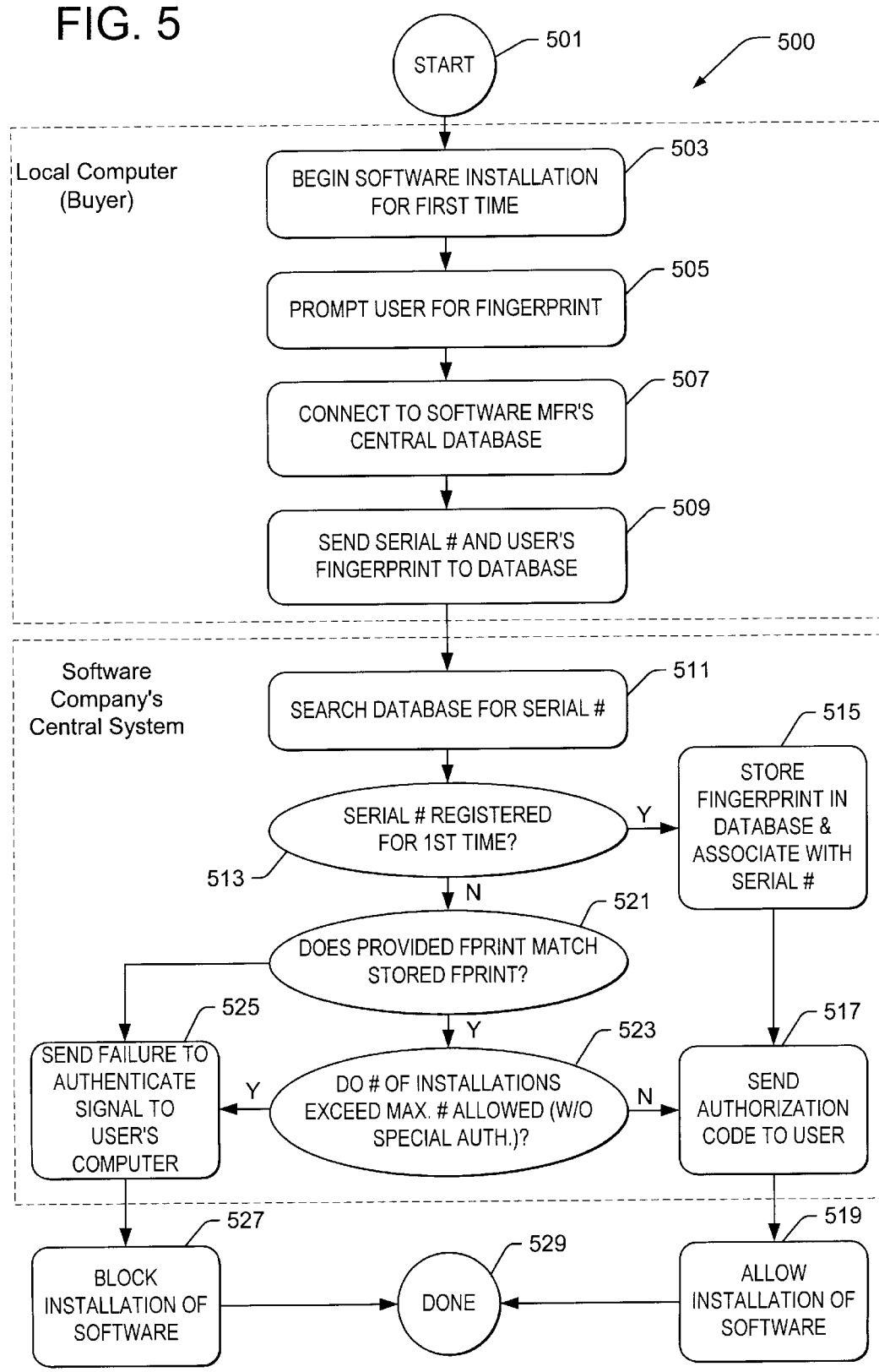
FIG. 5 is a process flow diagram depicting steps employed in the second preferred embodiment for authenticating operation of a software program.

A preferred software installation/authentication process 500 is represented in FIG. 5 and begins at 501. At the buyer's home or office 301, the buyer begins the first-time installation of software program 304 (step 503). The software then asks the user to provide the fingerprint information through an attached fingerprint capturing device 303 (step 505). Again, such a fingerprint capture device 303 can be any of kind and from any manufacturer.

Figure 3:
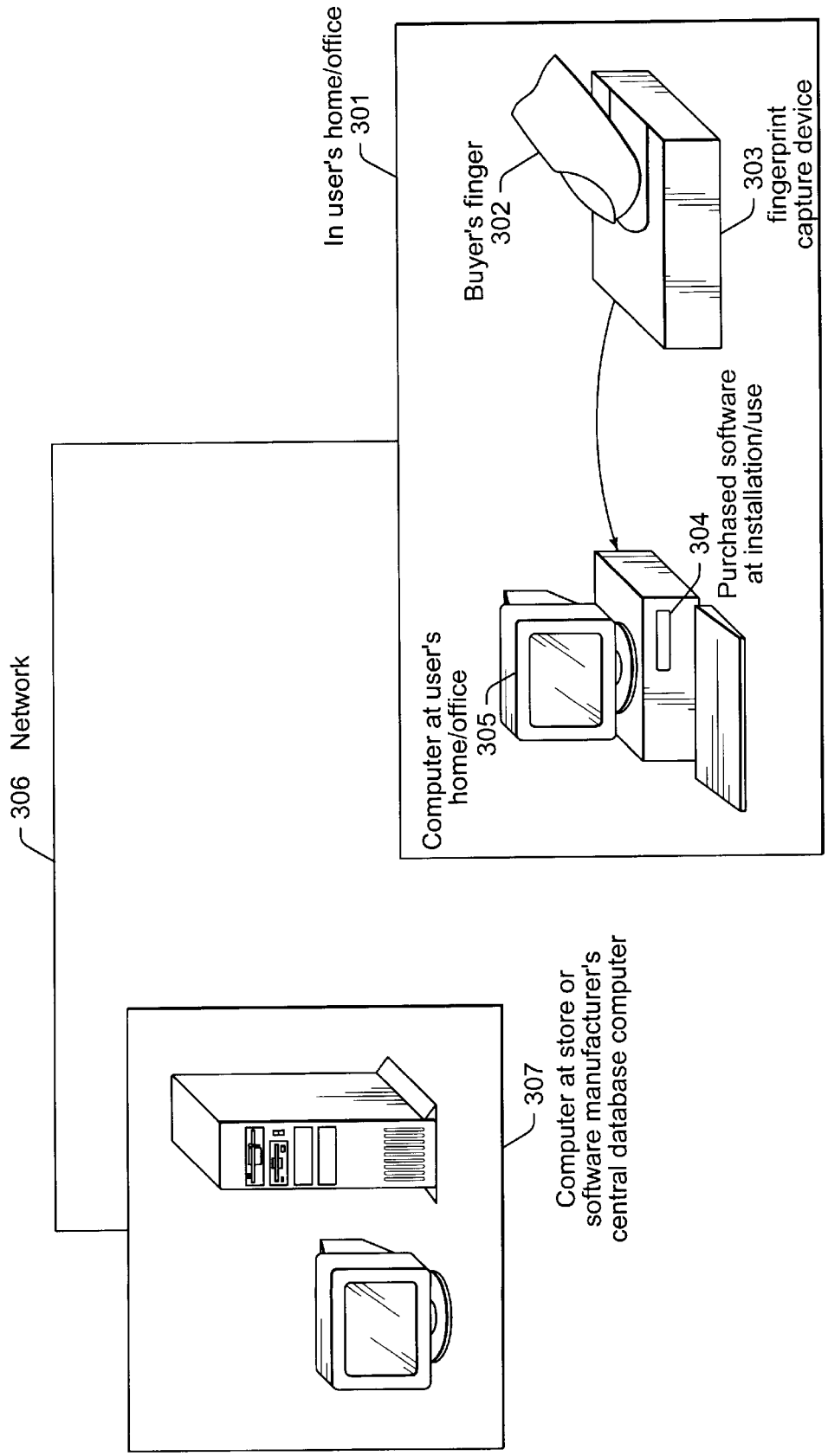
FIG. 3. is an illustration of a device/apparatus for fingerprint authentication in accordance with a second preferred embodiment of the present invention.

Next, as shown in FIG. 3, the purchased software 304 connects (step 507) via a modem/network 306 to the software manufacturer's central database system 307 and provides both the serial number 401 of the software and the user's fingerprint 302 (step 509). Unique serial numbers are embedded by the manufacturer in each copy of the software prior to purchase.

FIG. 4. represents a database or tabular list where every buyer's fingerprint 402 is stored. Each fingerprint 402 is permanently associated with the particular embedded serial number or other forms of ID of the copy of the software that he/she is installing for the first time after purchase. This list is kept in the server computer at the store or the software manufacturer's central database computer.

Returing to FIG. 5, at a step 511, the central system then searches its database (FIG. 4) for the serial number 401. At a decision step 513, the system determines whether the serial number has been registered before. If the serial number 401 is indeed being registered for the first time, the presented fingerprint information 402 is stored in the database and permanently associated with the serial number (step 515). A user authorization code is then sent back to the user's computer to authorize the use of the purchased software (step 517). Thereafter, installation of the software is allowed to proceed at the buyer's local computer 305 (step 519) and this process is concluded at 529.

If the system determines that the serial number it has received already has an associated fingerprint 402 in its database (decision step 513), it compares the newly provided fingerprint information with the existing stored one to determine if they match (decision step 521). If they do not match, the main system sends a signal back to the local program on the user's computer to signal the failure of authentication (step 525). This then blocks the installation of the software on the local system (step 527) and the process is concluded at 529.

If the two prints match (as determined at decision step 521), then the central system determines whether a pre-set maximum number of installations has been exceeded (decision step 523). The system may allow more than one installation but only up to a certain number of times that has been pre-set by the manufacturer (N.B. to allow the user to legally install on several of his or her computers). If this pre-set limit on the number of separate installations is exceeded (as determined by the central system at decision step 523), a special request from the user is required to allow proper installation of the software. Again, as detailed under method 1, this second method can also be modified so that the original primary buyer can allow his/her friends/relatives to become secondary users with temporary limited access to the software. As before, such use would involve the secondary users being re-validated to use the software by providing their fingerprints to the software in the presence of the primary user.

If the central system determines at step 523 that the number of installations did not exceed the pre-set maximum (or if it did it was done with special authorization), process control is directed to step 517, where the system sends a user authorization code as described above. If on the other hand, the central system determines that the number of installations exceeded the pre-set maximum without special authorization, then process control is directed to step 525, where a failure to authenticate signal is sent to the local computer.

With this second method, the potential drawback of the first method—the possible use of a generic or fake finger for initial registration at purchase and subsequent en masse illegal authorization of many copies of software—can be readily rectified. When a generic or fake finger is first used to authorize the use of the purchased copy of the software, the central server computer will allow such use and permanently associate the details of this generic fingerprint with the purchased copy's unique serial number. When it is used subsequently to install additional copies of the software the server will allow usage up to the pre-set limit of multiple installations that the buyer was allowed at the time of purchase. When this number is exceeded, as would be the case with illegal en masse piracy, the central server computer will block further attempts to install more copies of the software using this generic fingerprint.

These two methods can be used separately or in combination with one another. They will curtail the illegal piracy that has cost the software industry and consumers billions of dollars. A modified version of the second method could also be used to purchase software through the internet where after providing fingerprint 302 through the internet 306 to manufacturer 307, a copy of the software to be purchased encoded with serial number 401 and user's fingerprint 402 is downloaded or sent to user's computer 305 via network 306. The further distribution or installation of the software can be monitored as described in the second method. The only difference being that the software given to user is provided through a different media.

3. Fingerprint Capture and Matching Methods

Suitable design parameters of fingerprint capture devices 101 (FIG. 1) and 303 (FIG. 3) can be specified based upon the general requirements of fingerprint analysis and matching algorithms. A typical human fingerprint has an aspect ratio of about three to two; that is, it is one-half times as long as it is wide. The average fingerprint has about 50 ridgelines separated by intervening valley lines that are about equally as thick. Generally the lines run from left to right and as they do they first traverse upwards and later downwards. Given this amount of information, the Federal Bureau of Investigation ("FBI") has suggested that fingerprint detection systems should provide an array of 512×512 pixels since it allows for at least four pixels per ridgeline and four per valley line. Preferably, though not necessarily, imagers employed in the fingerprint capture devices 101 and 303 contains an array of at least 512×512 pixels. Using sophisticated fingerprint imaging algorithms such as those described in the above-referenced US Provisional Application 60//025,949, significantly smaller arrays can be employed. In one embodiment, the array may include 120× 160 pixels and in another embodiment may include 240×160 pixels. The use of such small arrays has the advantage of requiring (1) less processing resources from the local computer's CPU and (2) faster transmission of fingerprint data over serial ports such as those employed with computer mice.

Accurate fingerprint matching technology, which is well-known in the art (see, for example, U.S. Pat. Nos. 2,952,181, 4,151,512, 4,322,163, 4,537,484, 4,747,147, 5,467,403 which were previously incorporated by reference), has for over a hundred years relied on the extraction and subsequent comparison of specialized features called minutiae. Minutiae are essentially of two equally frequent types—either the abrupt ending of a line in the middle of the fingerprint or the fusion of two lines to create a Y-shaped junction. Typically there are about 60 or 70 such features in a fingerprint and it is the relative location of these from each other that creates a unique spatial pattern that statistically no other human can possess.

Figure 6:
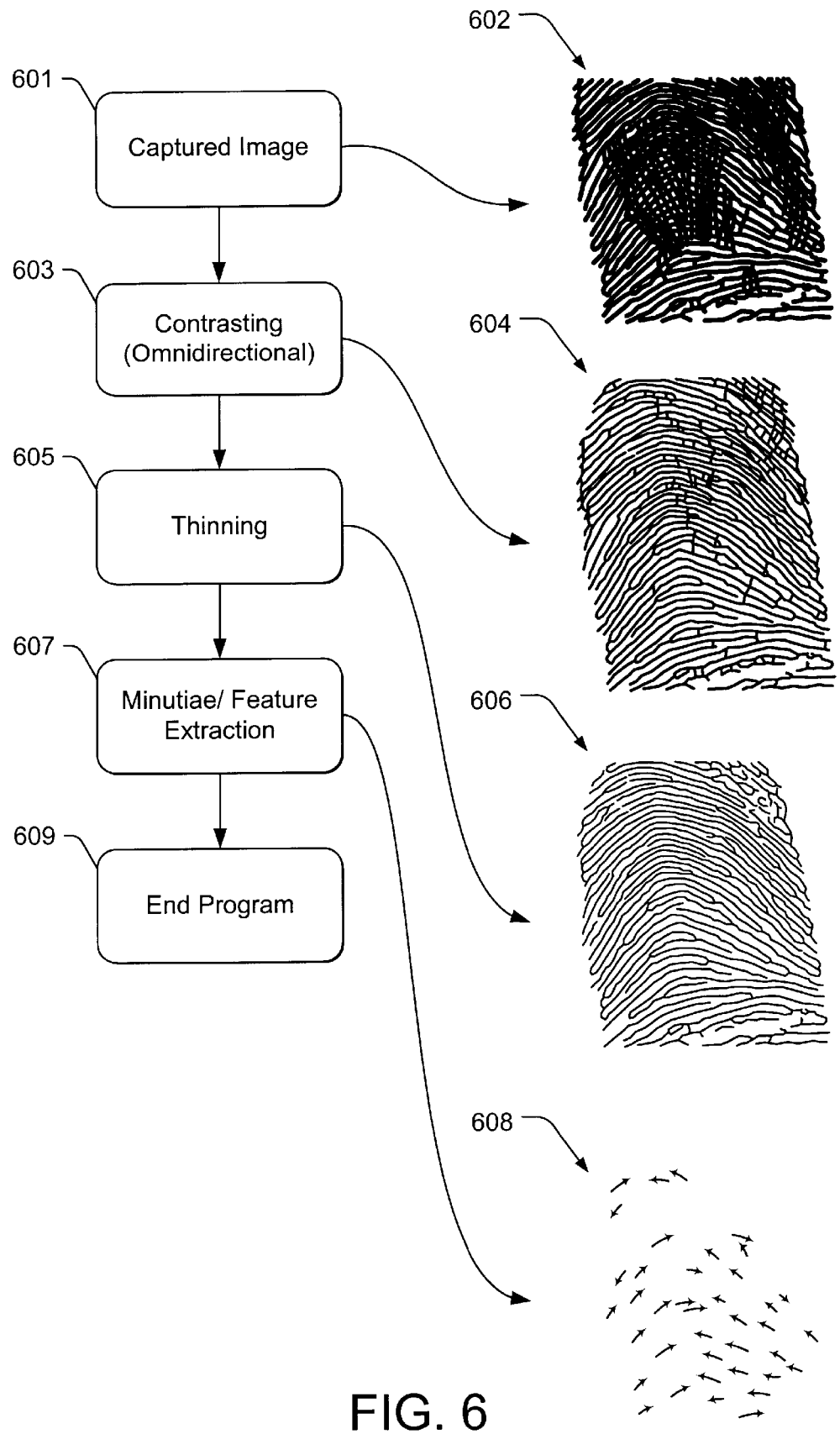
FIG. 6 is a flow diagram depicting a fingerprint matching technique that may be employed with the present invention.

Suitable methods of fingerprint matching may involve software processing steps as illustrated in FIG. 6. After capturing the fingerprint image (step 601), assuming the FBI-standard 512×512 pixel array, a contrasting algorithm (step 603) reduces all the gray shades of a captured image 602 to either black (for ridgelines) or white (for valley lines) as shown in image 604. Traditionally these algorithms are omnidirectional. Basically, the particular shade of gray at each pixel is compared with those of the neighboring pixels in all directions and if judged to be relatively darker than most of its neighbors it is deemed to be black, otherwise white. After this contrasting step, the contrasted image 604 is further processed by a thinning algorithm (step 605). The object here is to reduce the black lines from being on average four pixels thick to only one pixel thick, thereby increasing the number of white pixels substantially. A thinned image 606 is then examined by further algorithms (step 607) that attempt to deduce and accurately extract the minutiae and their locations as shown in a map 608. The process is then completed at 609. All further fingerprint matching/comparison relies only on these 60 or 70 extracted pieces of information.

After the minutiae have been extracted, they must be matched against the stored fingerprints. This requires matching the two-dimensional coordinates of the stored and recently captured fingerprints. If the coordinates match to within a defined tolerance, the tokens are deemed a match.

As known in the state of the art, many fingerprint matching schemes involve the generation of inter-minutiae-based keys (i.e., distance vectors, etc.) that while being generally similar, will vary between multiple impressions of the same finger. Various inter-minutiae distance-vector-derived formats are known in the art. Many of these (as well as variations on them) may be suitable for use with this invention.

Suitable matching schemes are described in, for example, U.S. Pat. No. 4,747,147 issued to Sparrow on May 24, 1988, U.S. Pat. No. 5,493,621 issued to Matsumura on Feb. 20, 1996, and information provided at the World Wide Web site www.Lucent.Com/Press/0597/minu1.GAF. Each of these documents is incorporated herein by reference for all purposes. A typical description of a processed fingerprint is a list of x, y and angle tabulation of each minutia. Minor modification to these linear values (e.g., adding slight random displacements) will still reflect the same underlying fingerprint, allowing for variation during multiple impressions (e.g., slight distortions and rolling during the pressing of the finger).

4. Other Embodiments

Another potential use of the above-described systems is that they give software manufacturers the option of charging their clients by usage—either by usage time or number of users. That is, the concept of pay-per-use. If the original user or buyer is given the option of adding additional users by the program, then the program can keep track of the number of users and the amount of elapsed time at each use. Such information can be sent back to the manufacturer periodically, either by postal mail for the first method or electronic mail for the second method, for billing purposes.

While this invention has been described in terms of a few preferred embodiments, it should not be limited to the specifics presented above. For example, while the system of this invention has been described as protecting a conventional software program, the invention may be employed to protect portions of a larger software suite by preventing unauthorized access to certain subroutines, modules, database views, etc. Many similar variations on the above-described preferred embodiment, may be employed. Therefore, the invention should be broadly interpreted with reference to the following claims.

What is claimed is:

1. A method for controlling installation of a software product, the method comprising:

(a) when fingerprint data has not been previously provided for the software product, storing a user's fingerprint data in association with a separate identifier for the software product, such that in installations of the software product, newly presented fingerprint data is matched against the stored fingerprint data;

(b) prior to an installation of the software product and after storing the user's fingerprint data, transmitting the user's fingerprint data and the separate identifier from a local computer of the user to a remote authentication system controlled by an enterprise responsible for distribution of the software product;

(c) determining whether the fingerprint data provided allows installation of the software product, such that if the transmitted fingerprint data is not found to match the stored fingerprint data, blocking installation of the software product; and (d) determining whether the number of installations exceeds a pre-set maximum, such that installation is blocked if the number of installations is found to exceed the pre-set maximum.

2. The method of claim 1, wherein blocking installation comprises transmitting instructions to block to a local computer of the user from a remote authentication system controlled by an enterprise responsible for distribution of the software product.

3. The method of claim 1, wherein the software product is purchased over the Internet.

4. The method of claim 1, further comprising monitoring a length of time during which the software product is operated by said user so that the user can be charged for the quantity of use.

5. The method of claim 1, further comprising:

(i) beginning execution of the software product; and (ii) prompting the user to provide said fingerprint data prior to continued execution of the software product.

6. The method of claim 1, further comprising storing fingerprint data for a plurality of users, each of whom can use or install the software product.

7. A computer readable medium on which is provided instructions for operating a computer system to control installation of a software product, the instructions, when executed by the computer system, performing the steps of:

(a) when fingerprint data has not been previously provided for the software product, storing a user's fingerprint data in association with a separate identifier for the software product, such that in installations of the software product, newly presented fingerprint data is matched against the stored fingerprint data;

(b) prior to an installation of the software product and after storing the user's fingerprint data, transmitting the user's fingerprint data and the separate identifier from a local computer of the user to a remote authentication system controlled by an enterprise responsible for distribution of the software product;

(c) determining whether the fingerprint data provided allows installation of the software product, such that if the transmitted fingerprint data is not found to match the stored fingerprint data, blocking installation of the software product; and (d) determining whether the number of installations exceeds a pre-set maximum, such that installation is blocked if the number of installations is found to exceed the pre-set maximum.

8. The computer readable medium of claim 7, wherein instructions for blocking installation comprise instructions for transmitting instructions to block to a local computer of the user from a remote authentication system controlled by an enterprise responsible for distribution of the software product.

9. The computer readable medium of claim 7, wherein the software product is purchased over the Internet.

10. The computer readable medium of claim 7, further comprising instructions for monitoring a length of time during which the software product is operated by said user so that the user can be charged for the quantity of use.

11. The computer readable medium of claim 7, further comprising instructions for prompting the user to provide said fingerprint data after beginning execution of the software product and prior to continued execution of the software product.

12. The computer readable medium of claim 7, further comprising instructions for storing fingerprint data for a plurality of users, each of whom can use or install the software product.

* * * * *